United States Patent Office 3,712,927
Patented Jan. 23, 1973

3,712,927
ALKANOLAMINE DERIVATIVES
Ralph Howe and Leslie Harold Smith, Macclesfield, England, assignors to Imperial Chemical Industries Limited, London, England
No Drawing. Filed Sept. 19, 1968, Ser. No. 760,999
Claims priority, application Great Britain, Sept. 27, 1967, 43,927/67
Int. Cl. C07c 101/44, 103/38
U.S. Cl. 260—471 C          2 Claims

ABSTRACT OF THE DISCLOSURE

The disclosure relates to 1-(4-acylamino-2-substituted-phenoxy)-3-amino-2-propanol derivatives, processes for their manufacture, pharmaceutical compositions containing them and a method of using them to produce cardiac β-adrenergic blockade in warm-blooded animals. Representative of the compounds disclosed is 1-(2-bromo-4-propionamidophenoxy)-3-t-butylamino-2-propanol.

---

This invention relates to new alkanolamine derivatives which possess β-adrenergic blocking activity and which are therefore useful in the treatment or prophylaxis of heart diseases, for example angina pectoris and cardiac arrhythmias, and in the treatment of hypertension and phaeochromocytoma, in man.

According to the invention we provide new alkanolamine derivatives of the formula:

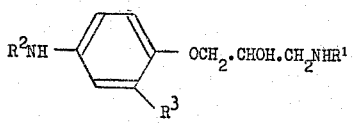

wherein $R^1$ stands for an alkyl radical which may optionally be substituted by one or more substituents selected from hydroxy, alkoxy, aryl and aryloxy radicals, which aryl and aryloxy radicals may themselves optionally be further substituted by one or more halogen atoms or alkyl or alkoxy radicals, or wherein $R^1$ stands for a cycloalkyl or alkenyl radical, wherein $R^2$ stands for an acyl radical, and wherein $R^3$ stands for a halogen atom or for an alkylthio, aryl, aryloxy, alkoxyalkyl, hydroxyalkyl, halogenoalkyl, aralkyl, cycloalkyl, acyl, alkoxycarbonyl or cyano radical, and the esters and aldehyde-condensation products and acid-addition salts thereof.

It is to be understood that the above definition of alkanolamine derivatives encompasses all possible stereoisomers thereof, and mixtures thereof.

As a suitable value for $R^1$ when it stands for an alkyl radical, optionally substituted, there may be mentioned, for example, an alkyl radical of up to 12 carbon atoms and particularly of 3, 4 or 5 carbon atoms, which preferably is branched at the α-carbon atom, for example the isopropyl, s-butyl or t-butyl radical, which alkyl radical may optionally be substituted by one or two substituents selected from hydroxy radicals, alkoxy radicals of up to 5 carbon atoms, for example methoxy and propoxy radicals, and phenyl and phenoxy radicals which may themselves optionally be substituted by one or more chlorine or bromine atoms or methyl, ethyl, methoxy or ethoxy radicals. Thus, a specific value for $R^1$ when it stands for an alkyl radical, optionally substituted, is the isopropyl, s-butyl, t-butyl, 2-hydroxy-1,1-dimethylethyl or 1,1-dimethyl-2-phenylethyl radical.

As a suitable value for $R^1$ when it stands for a cycloalkyl radical there may be mentioned, for example, a cycloalkyl radical of up to 8 carbon atoms, for example the cyclopropyl, cyclobutyl or cyclopentyl radical.

As a suitable value for $R^1$ when it stands for an alkenyl radical there may be mentioned, for example, an alkenyl radical of 3 to 6 carbon atoms, for example the allyl radical.

As a suitable value for $R^2$ there may be mentioned, for example, an acyl radical derived from a carboxylic acid or from a sulphonic acid. Such a radical may be, for example, the formyl radical; an alkanoyl radical, for example an alkanoyl radical of up to 10 carbon atoms, for example the acetyl, propionyl, butyryl, valeryl, pivaloyl, pentanoyl, hexanoyl or heptanoyl radical; a halogenoalkanoyl radical, for example a halogenoalkanoyl radical of up to 6 carbon atoms, for example the chloroacetyl radical; a cycloalkanecarbonyl radical, for example a cycloalkanecarbonyl radical of up to 10 carbon atoms, for example the cyclopropanecarbonyl or cyclohexanecarbonyl radical; an alkenoyl radical, for example an alkenoyl radical of up to 6 carbon atoms, for example the acryloyl or crotonoyl radical; an aroyl radical, for example an aroyl radical of up to 10 carbon atoms, for example the benzoyl, p-methylbenzoyl or p-chlorobenzoyl radical; an aralkanoyl or aralkenoyl radical, for example an aralkanoyl or aralkenoyl radical of up to 10 carbon atoms, for example the phenylacetyl or cinnamoyl radical; an aryloxyalkanoyl radical, for example an aryloxyalkanoyl radical of up to 10 carbon atoms, for example the phenoxyacetyl radical; an alkanesulphonyl radical, for example an alkanesulphonyl radical of up to 6 carbon atoms, for example the methanesulphonyl or ethanesulphonyl radical; an arenesulphonyl radical, for example an arenesulphonyl radical of up to 10 carbon atoms, for example the benzenesulphonyl or toluene-p-sulphonyl radical; or an alkoxycarbonyl radical, for example an alkoxycarbonyl radical of up to 6 carbon atoms, for example the ethoxycarbonyl radical.

As a suitable value for $R^3$ when it stands for a halogen atom there may be mentioned, for example, the fluorine, chlorine, bromine or iodine atom.

As a suitable value for $R^3$ when it stands for an alkylthio, cycloalkyl, acyl or alkoxycarbonyl radical there may be mentioned, for example, an alkylthio, cycloalkyl, alkanoyl or alkoxycarbonyl radical each of up to 6 carbon atoms, for example the methylthio, ethylthio, cyclohexyl, acetyl, propionyl, methoxycarbonyl or ethoxycarbonyl radical.

As a suitable value for $R^3$ when it stands for an aryl or aryloxy radical there may be mentioned, for example, an aryl or aryloxy radical of up to 10 carbon atoms, for example the phenyl or phenoxy radical, which may optionally be substituted by, for example, one or more halogen atoms, nitro radicals or alkyl or alkoxy radicals each of up to 4 carbon atoms, for example methyl or methoxy radicals, for example to give the p-tolyloxy radical.

As a suitable value for $R^3$ when it stands for a hydroxyalkyl, alkoxyalkyl, halogenoalkyl or aralkyl radical there may be mentioned, for example, an alkyl radical of up to 4 carbon atoms which is substituted by the hydroxy radical, or by an alkoxy radical of up to 6 carbon atoms, or by one or more halogen atoms, or by the phenyl radical, for example the hydroxymethyl, methoxymethyl, n-butoxymethyl, trifluoromethyl, benzyl or α-phenylethyl radical.

As suitable esters of the alkanolamine derivatives of the invention there may be mentioned, for example, esters derived from an aliphatic carboxylic acid of up to 20 carbon atoms, for example acetic, palmitic, stearic or oleic acid, or esters derived from an aromatic carboxylic acid of up to 10 carbon atoms, for example benzoic acid, and the acid-addition salts thereof.

As suitable aldehyde condensation products of the alkanolamine derivatives of the invention there may be mentioned, for example, the 5-aryloxymethyl-3-alkyloxazolidine derivatives obtained by the condensation of an aldehyde of the formula $R^4.CHO$, wherein $R^4$ stands for hydrogen or for an alkyl radical, with the alkanolamine derivatives of the invention, and the acid-addition salts thereof.

As a suitable value for $R^4$ when it stands for an alkyl radical there may be mentioned, for example, an alkyl radical of up to 4 carbon atoms, for example the isopropyl radical.

As suitable acid-addition salts of the alkanolamine derivatives of the invention, or of the esters thereof, or of the aldehyde condensation products thereof, there may be mentioned, for example, salts derived from inorganic acids, for example hydrochlorides, hydrobromides, phosphates or sulphates, or salts derived from organic acids, for example oxalates, lactates, tartrates, acetates, salicylates, citrates, benzoates, β-naphthoates, adipates or 1,1-methylene-bis-(2-hydroxy-3-naphthoates), or salts derived from acidic synthetic resins, for example sulphonated polystyrene resins, for example "Zeo-Karb" 225 ("Zeo-Karb" is a trade mark).

A particularly preferred group of alkanolamine derivatives of the invention comprises compounds of the formula:

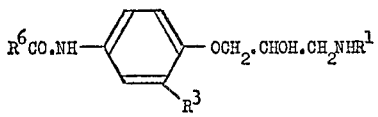

wherein $R^1$ stands for the isopropyl or t-butyl radical, wherein $R^3$ has the meaning stated above, and wherein $R^6$ stands for an alkyl radical of up to 6 carbon atoms, and the acid-addition salts thereof.

Specific alkanolamine derivatives of the invention are those particularly described hereinafter in Examples 1 to 19. Of these, preferred compounds are those having the latter formula given above wherein:

(a) $R^1$ stands for the isopropyl radical and either $R^6$ stands for the methyl radical and $R^3$ stands for the fluorine, chlorine or bromine atom or for the methylthio or phenyl radical; or $R^6$ stands for the ethyl radical and $R^3$ stands for the fluorine, chlorine, bromine or iodine atom or for the phenyl, p-tolyloxy, methoxymethyl, benzyl, α-phenylethyl, cyclohexyl or propionyl radical; or $R^6$ stands for the n-propyl radical and $R^3$ stands for the p-tolyloxy radical; or $R^6$ stands for the n-butyl or n-hexyl radical and $R^3$ stands for the bromine atom; or (b) $R^1$ stands for the t-butyl radical and either $R^6$ stands for the methyl radical and $R^3$ stands for the chlorine atom; or $R^6$ stands for the ethyl radical and $R^3$ stands for the fluorine, chlorine, bromine or iodine atom or for the methylthio, phenoxy, hydroxymethyl, trifluoromethyl, benzyl, α-phenylethyl, methoxycarbonyl or cyano radical; or $R^6$ stands for the n-propyl, n-pentyl or phenyl radical and $R^3$ stands for the bromine atom; or (c) $R^1$ stands for the s-butyl, 2-hydroxy-1,1-dimethylethyl or cyclopentyl radical, $R^6$ stands for the ethyl radical and $R^3$ stands for the bromine atom;

And the acid-addition salts thereof.

According to a further feature of the invention we provide a process for the manufacture of the alkanolamine derivatives of the invention which comprises the interaction of a compound of the formula:

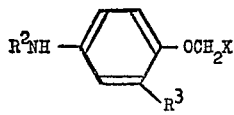

wherein $R^2$ and $R^3$ have the meanings stated above and wherein X stands for the group

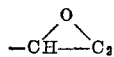

or the group $-CHOH.CH_2Y$, wherein Y stands for a halogen atom, or of mixtures of such compounds wherein X has both meanings stated above, with an amine of the formula $NH_2R^1$, wherein $R^1$ has the meanings stated above.

As a suitable value for Y there may be mentioned, for example, the chlorine or bromine atom. The interaction may be carried out at ambient temperature or it may be accelerated or completed by the application of heat, for example by heating to a temperature of up to 110° C.; it may be carried out at atmospheric or at an elevated pressure, for example by heating in a sealed vessel; and it may be carried out in an inert diluent or solvent, for example methanol or ethanol, or an excess of the amine of the formula $NH_2R^1$, wherein $R^1$ has the meaning stated above, may be used as diluent or solvent.

The starting material used in the above process may be obtained by the interaction of the corresponding phenol with an epihalohydrin, for example epichlorohydrin. The said starting material may be isolated or it may be prepared and used in situ without isolation.

According to a further feature of the invention we provide a process for the manufacture of the alkanolamine derivatives of the invention which comprises the interaction of a compound of the formula:

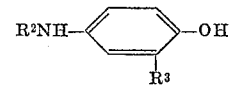

wherein $R^2$ and $R^3$ have the meanings stated above, with a compound of the formula:

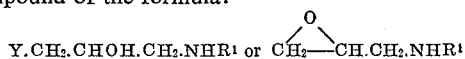

wherein $R^1$ and Y have the meanings stated above.

The last-named interaction may conveniently be carried out in the presence of an acid-binding agent, for example sodium hydroxide. Alternatively, an alkali metal derivative of the phenol reactant, for example the sodium or potassium derivative, may be used as starting material. The interaction may be carried out in a diluent or solvent, for example methanol or ethanol, and it may be accelerated or completed by the application of heat, for example by heating to the boiling point of the diluent or solvent.

According to a further feature of the invention we provide a process for the manufacture of the alkanolamine derivatives of the invention which comprises the interaction of an aminophenyl derivative of the formula:

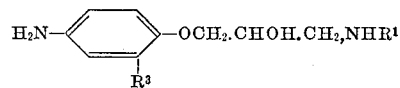

wherein $R^1$ and $R^3$ have the meanings stated above, with an acylating agent derived from an acid of the formula $R^2OH$, wherein $R^2$ has the meaning stated above, under such conditions that neither the amino nor the hydroxy radical of the alkanolamine side-chain are acylated.

A suitable acylating agent for use in the last-mentioned process is, for example, an acid halide, for example the acid chloride, or the acid anhydride, or a mixed acid anhydride, for example the mixed anhydride with monoethyl carbonic acid, or an activated ester, for example the p-nitrophenyl ester, derived from the acid of the formula $R^2OH$, wherein $R^2$ has the meaning stated above. Alternatively, the acid of the formula $R^2OH$ may itself be used as acylating agent, in the presence of a condensing agent, for example a carbodi-imide, for example N,N¹-dicyclohexylcarbodi-imide.

The last-mentioned process may be carried out in a diluent or solvent, for example an aqueous diluent or solvent, for example water, an aqueous ketone, for example aqueous acetone, an aqueous alcohol, for example aqueous ethanol, or an aqueous acid, for example aqueous acetic acid; or a non-aqueous organic diluent or solvent, for example a ketone, for example acetone; an alcohol, for example ethanol; an ester, for example ethyl acetate; or an amide, for example dimethylformamide. The process is preferably carried out at a temperature within the range of 0 to 60° C., and most conveniently is carried out at ambient temperature. When aqueous conditions are used, the process is preferably carried out at a pH of between 3 and 5.

The aminophenyl derivative used as starting material in the last-mentioned process may be obtained by the reduction, for example by catalytic hydrogenation, of the corresponding nitrophenyl derivative. Alternatively, the said starting material may be obtained by the hydrolysis of a corresponding acylaminophenyl derivative prepared by one of the other processes of the invention.

According to a further feature of the invention we provide a process for the manufacture of those of the alkanolamine derivatives of the invention wherein $R^1$ does not stand for a hydrogenolysable aralkyl group which comprises the hydrogenolysis of a compound of the formula:

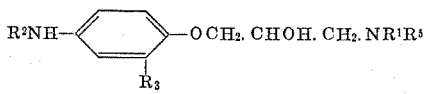

wherein $R^1$, $R^2$ and $R^3$ have the meanings stated above and wherein $R^5$ stands for a hydrogenolysable radical, or an acid-addition salt thereof.

As a suitable value for $R^5$ there may be mentioned, for example, an α-aryl-alkyl radical, for example the benzyl radical. The hydrogenolysis may be effected, for example, by catalytic hydrogenation, for example by hydrogenation in the presence of a palladium-on-charcoal catalyst, in an inert diluent or solvent, for example ethanol or aqueous ethanol. The process may be accelerated or completed by the presence of an acidic catalyst, for example hydrochloric or oxalic acid.

The starting material used in the last-mentioned process may be obtained by the acylation of the corresponding compound wherein $R^2$ stands for hydrogen with an acylating agent derived from the acid of the formula $R^2$—OH, wherein $R^2$ has the meaning stated above. A suitable acylating agent is, for example, an acyl halide or acid anhydride, or the acid itself in the presence of a condensing agent, for example a carbodi-imide. Alternatively, the starting material may be obtained by the interaction of a compound of the formula:

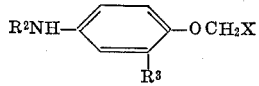

wherein $R^2$, $R^3$ and X have the meanings stated above, with an amine of the formula $NHR^1R^5$, wherein $R^1$ and $R^5$ have the meanings stated above, or by the interaction of a compound of the formula:

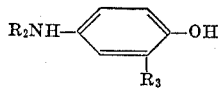

wherein $R^2$ and $R^3$ have the meanings stated above, with a compound of the formula:

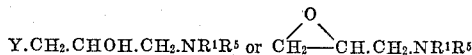

wherein $R^1$, $R^5$ and Y have the meanings stated above.

According to a further feature of the invention we provide a process for the manufacture of those of the alkanolamine derivatives of the invention wherein $R^1$ stands for a radical of the formula —$CHR^7R^8$, wherein $R^7$ stands for hydrogen or for an alkyl radical and $R^8$ stands for an alkyl radical which may optionally be substituted such that $R^1$ is optionally substituted as stated above, or wherein $R^7$ and $R^8$ are joined together with the adjacent carbon atom to form a cycloalkyl radical, which comprises the interaction of an amino derivative of the formula:

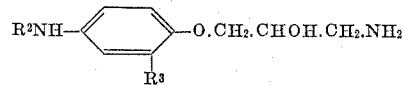

wherein $R^2$ and $R^3$ have the meanings stated above, or an acid-addition salt thereof, with a carbonyl compound of the formula $R^7.CO.R^8$, wherein $R^7$ and $R^8$ have the meanings stated above, under reducing conditions.

Suitable reducing conditions are those provided by the presence of hydrogen and a hydrogenation catalyst, for example platinum, in an inert diluent or solvent, for example water or ethanol, and/or, in the case where in the said carbonyl compound used as starting material $R^7$ stands for an alkyl radical, in an excess of the carbonyl compound used as starting material; or by the presence of an alkali metal borohydride, for example sodium borohydride, in an inert diluent or solvent, for example in one or more solvents selected from water, ethanol, methanol and an excess of the carbonyl compound used as starting material. It is to be understood that when in the starting material $R^3$ stands for a halogen atom or for an alkylthio, acyl or cyano radical, hydrogen and a hydrogenation catalyst are preferably not used to provide the reducing conditions, in order to prevent the radical $R^3$ from being affected by catalytic hydrogenation.

The amino derivative used as starting material may be obtained by the interaction of the corresponding epoxide or halohydrin with ammonia.

According to a further feature of the invention we provide a process for the manufacture of the alkanolamine derivatives of the invention which comprises the interaction of an amino derivative of the formula:

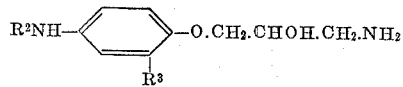

wherein $R^2$ and $R^3$ have the meanings stated above, or an acid-addition salt thereof, with a compound of the formula $R^1Z$ wherein $R^1Z$ stands for a reactive ester derived from an alcohol of the formula $R^1OH$, wherein $R^1$ has the meaning stated above.

As a suitable value for Z there may be mentioned, for example, the chlorine, bromine or iodine atom, the toluene-p-sulphonyloxy radical or a radical of the formula: —$OSO_2OR^1$, wherein $R^1$ has the meaning stated above. A particularly suitable compound of the formula $R^1Z$ is isopropyl bromide.

The interaction may conveniently be carried out in the presence of a base, for example an inorganic base, for example sodium or potassium carbonate, in the presence of a catalyst, for example potassium iodide, and in the presence of a diluent or solvent, for example ethanol or isopropanol. The interaction may conveniently be carried out at an elevated temperature, for example at a temperature of between 50 and 200° C., for example at about 70° C.

According to a further feature of the invention we provide a process for the manufacture of the esters of the alkanolamine derivatives of the invention which comprises the interaction of an acid-addition salt of the corresponding unesterified alkanolamine derivative with an acylating agent.

As a suitable acylating agent there may be mentioned, for example, an acid halide or acid anhydride derived from an aliphatic carboxylic acid, for example such an acid of not more than 20 carbon atoms, or derived from an aromatic carboxylic acid, for example such an acid of not more than 10 carbon atoms. Thus a suitable acylating agent is, for example, acetic anhydride, acetyl chloride or benzoyl chloride. The acylation may be carried out in a diluent or solvent, which, in the case where an acid anhydride is used as acylating agent, may conveniently be the acid from which the anhydride is derived.

According to a further feature of the invention we provide a process for the manufacture of the oxazolidine derivatives of the alkanolamines of the invention which comprises the interaction of the corresponding alkanolamine derivative, or an acid-addition salt thereof, with an aldehyde of the formula $R^4CHO$, wherein $R^4$ has the meaning stated above.

The said interaction may be carried out in a diluent or solvent, for example ethanol, optionally in the presence of a catalyst, for example hydrochloric acid, acetic acid or iodine, and it may be accelerated or completed by the application of heat. The water formed during the reaction may optionally be removed by azeotropic distillation using a suitable solvent, for example benzene, toluene or chloroform, as entraining agent, or it may optionally be removed by means of a dehydrating agent, for example anhydrous potassium carbonate.

The alkanolamine derivatives of the invention or the esters or aldehyde-condensation products thereof in free base form may be converted into the acid-addition salts thereof by reaction with an acid by conventional means.

As stated above, the alkanolamine derivatives of the present invention are of value in the treatment or prophylaxis of heart diseases. Furthermore, some of the alkanolamine derivatives of the invention possess selective $\beta$-adrenergic blocking activity. Compounds exhibiting this selective action show a greater degree of specificity in blocking the cardiac $\beta$-receptors than the $\beta$-receptors in peripheral blood vessels and bronchial muscle. Thus, a dose may be selected for such a compound at which the compound blocks the cardiac chronotropic action of a catecholamine [for example isoprenaline, that is 1-(3,4-dihydroxyphenyl)-2-isopropylaminoethanol] but does not block the relaxation of tracheal smooth muscle produced by isoprenaline or the peripheral vasodilator action of isoprenaline. Because of this selective action, one of these compounds may advantageously be used together with a sympathomimetic bronchodilator, for example isoprenaline, orciprenaline, adrenaline or ephedrine, in the treatment of asthma and other obstructive airways diseases, inasmuch as the selective compound will substantially inhibit the unwanted stimulatory effects of the bronchodilator on the heart but will not hinder the desirable therapeutic effect of the bronchodilator.

According to a further feature of the invention, therefore, we provide pharmaceutical compositions comprising as active ingredient one or more alkanolamine derivaatives of the invention, or esters thereof, or aldehyde condensation products thereof, or acid-addition salts thereof, in association with a pharmaceutically-acceptable diluent or carrier therefor.

As suitable compositions there may be mentioned, for example, tablets, capsules, aqueous or oily solutions or suspensions, emulsions, injectable aqueous or oily solutions or suspensions, dispersible powders, sprays or aerosol formulations.

The pharmaceutical compositions of the invention may contain, in addition to the alkanolamine derivative of the invention, one or more drugs selected from sedatives, for example phenobarbitone, meprobamate and chloropromazine; vasodilators, for example glyceryl trinitrate, pentaerythritol tetranitrate and isosorbide dinitrate; diuretics, for example chlorothiazide; hypotensive agents, for example reserpine, bethanidine and guanethidine; myocardial depressants, for example quinidine; agents used in the treatment of Parkinson's disease, for example benzhexol; and cardiotonic agents, for example digitalis preparations. Those of the pharmaceutical compositions of the invention which contain an alkanolamine derivative which possesses selective $\beta$-adrenergic blocking properties as stated above may additionally contain a sympathomimetic bronchodilator, for example isoprenaline, orciprenaline, adrenaline or ephedrine.

It is expected that the preferred compounds would be given to man at an oral dose of between 20 mg. and 600 mg. daily, at doses spaced at 6–8 hourly intervals, or at an intravenous dose of between 1 mg and 20 mg. daily. Preferred oral dosage forms are tablets or capsules containing between 10 mg. and 100 mg., and preferably 10 mg. or 40 mg. of active ingredient. Preferred intravenous dosage forms are sterile aqueous solutions of the alkanolamine derivatives or of non-toxic acid-addition salts thereof, containing between 0.05% and 1% w./v. of active ingredient, and more particularly containing 0.1% w./v. of active ingredient.

The invention is illustrated but not limited by the following examples in which the parts are by weight:

EXAMPLE 1

A mixture of 1.85 parts of 1-(4-acetamido-2-fluorophenoxy)-2,3-epoxypropane, 25 parts of isopropylamine and 25 parts of ethanol is heated under reflux for 4 hours. The mixture is evaporated to dryness under reduced pressure and the residue is stirred with a solution of 1 part of sodium chloride in 10 parts of water and extracted twice with 10 parts of ethyl acetate. The combined ethyl acetate extracts are dried over anhydrous magnesium sulphate and evaporated to dryness under reduced pressure. The residue is crystallised from ethyl acetate and there is thus obtained 1 - (4-acetamido-2-fluorophenoxy)-3-isopropylamino-2-propanol, M.P. 122–123° C.

The 1 - (4 - acetamido - 2 - fluorophenoxy) - 2,3-epoxypropane used as starting material may be obtained as follows:

A solution of 8.3 parts of sulphanilic acid, 2.26 parts of anhydrous sodium carbonate and 3.16 parts of sodium nitrite in 51.5 parts of water is cooled to 15° C. and then added to a mixture of 9 parts of aqueous 11 N-hydrochloric acid and 50 parts of ice. The resulting suspension is stirred and a solution of 4.04 parts of 2-fluorophenol and 9.4 parts of sodium hydroxide in 50 parts of water is added. The mixture is heated to 30° C. and then stirred at ambient temperature for 1 hour. 19.6 parts of sodium dithionite are added and the mixture is heated at 75° C. for 15 minutes and then kept at 4° C. for 18 hours. The mixture is acidified with aqueous 11 N-hydrochloric acid and extracted twice with 10 parts of ethyl acetate each time. The aqueous acidic phase is separated and adjusted to pH=7 with aqueous sodium bicarbonate solution, 50 parts of acetic anhydride are added and the mixture is heated at 90° C. for 2 hours. The mixture is then cooled and extracted twice with 100 parts of ethyl acetate each time. The ethyl acetate extracts are dried over anhydrous magnesium sulphate and evaporated to dryness under reduced pressure. The residue is stirred with 50 parts of ether, the mixture is filtered and the solid residue is washed with ether and dried. To a mixture of 1.4 parts of this residue, 3.2 parts of epichlorohydrin and 25 parts of ethanol there is added a solution of 0.4 part of sodium hydroxide in 4 parts of water and 25 parts of ethanol. The mixture is heated under reflux for 3 hours and then evaporated to dryness under reduced pressure. The residue consists of 1-(4-acetamido-2-fluorophenoxy)-2,3-epoxypropane.

EXAMPLE 2

A mixture of 3.4 parts of 1-(2-fluoro-4-propionamidophenoxy)-2,3-epoxypropane, 25 parts of t-butylamine and 25 parts of ethanol is heated under reflux for 6 hours. The mixture is evaporated to dryness under reduced pressure and the residue is extracted with a mixture of 25 parts of aqueous N-hydrochloric acid and 25 parts of ether. The acidic phase is separated and basified with 11 N-sodium hydroxide solution and the mixture is extracted twice with 50 parts of ethyl acetate each time. The combined extracts are dried over anhydrous magnesium sulphate and evaporated to dryness under reduced pressure. The residue is dissolved in 10 parts of methanol and the solution is applied to three 40 cm. x 20 cm. x 2 mm. chromatography plates of silica gel (Kieselgel P.F. 254; Code No. Merck 7749). The plates are developed by means of a solvent mixture of 99 parts of methanol and 1 part of aqueous ammonium hydroxide solution (specific gravity 0.88). The bands having an $R_f$ value of 0.42 are collected, combined, dried and extracted twice with 100 parts of methanol each time. The mixture is filtered and the filtrate is evaporated to dryness under reduced pressure. The residue is dissolved in 10 parts of ethyl acetate, the mixture is filtered and the filtrate is evaporated to dryness under reduced pressure. The residue consists of 1-(2-fluoro-4-propionamidophenoxy)-3-t-butylamino-2-propanol, M.P. 108–110° C.

The process described above is repeated except that 25 parts of isopropylamine are used in place of the 25 parts of t-butylamine. There is thus obtained 1-(2-fluoro-4-propionamidophenoxy)-3-isopropylamino - 2 - propanol as an oil.

The 1 - (2 - fluoro - 4 - propionamidophenoxy) - 2,3-epoxypropane used as starting material may be obtained by a similar process to that described in the second part of Example 1, except that propionic anhydride is used in place of acetic anhydride.

EXAMPLE 3

A mixture of 1.8 parts of 1-(4-acetamido - 2 - bromophenoxy)-2,3-epoxypropane, 25 parts of isopropylamine and 25 parts of ethanol is heated under reflux for 4 hours. The mixture is evaporated to dryness under reduced pressure, the residue is shaken with 25 parts of aqueous N - hydrochloric acid and the mixture is extracted with 25 parts of ethyl acetate. The aqueous phase is separated and basified with aqueous 11 N-sodium hydroxide solution. The mixture is extracted twice with 25 parts of ethyl acetate each time and the combined ethyl acetate extracts are dried over anhydrous magnesium sulphate and evaporated to dryness under reduced pressure. The residue is crystallised from 20 parts of ethyl acetate and there is thus obtained 1-(4-acetamido-2-bromophenoxy)-3-isoproplamino-2-propanol, M.P. 142–144° C.

The process described above is repeated except that the appropriate epoxide and amine are used, and there are thus obtained by similar means the compounds described in the following table:

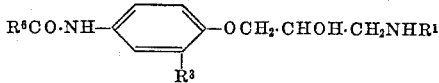

| R¹ | R⁶ | R³ | Melting point (° C.) | Crystallisation solvent |
|---|---|---|---|---|
| Isopropyl | Ethyl | Bromo | 146–148 | Ethyl acetate. |
| t-Butyl | do | do | ¹ 200–202 | Isopropanol/ether. |
| Isopropyl | Methyl | Methylthio | 142–144 | Ethyl acetate. |

¹ Hydrochloride.

The epoxides used as starting materials in the above process may be obtained by the process described in the second part of Example 1, except that the 2-fluorophenol is replaced by the appropriate 2-substituted phenol.

EXAMPLE 4

2.3 parts of epichlorohydrin are added gradually to a stirred solution of 2.3 parts of 4-acetamido - 2 - phenylphenol in 50 parts of aqueous 0.2 N-sodium hydroxide solution, the temperature of the mixture being maintained between 10 and 15° C. The mixture is stirred at ambient temperature for 3 hours, and then filtered. The solid residue is added to 25 parts of isopropylamine and the solution is heated under reflux for 5 hours. The excess isopropylamine is removed by evaporation under reduced pressure, the residue is dissolved in 30 parts of aqueous N-hydrochloric acid and the mixture is extracted with ether. The acidic layer is separated and basified with aqueous 2 N-sodium hydroxide solution and the mixture is extracted with ether. The ethereal extract is separated and evaporated to dryness, and the solid residue is crystallised from ethyl acetate. There is thus obtained 1-(4-acetamido-2-phenylphenoxy) - 3 - isopropylaminopropan-2-ol, M.P. 155–156° C.

EXAMPLE 5

A mixture of 4.2 parts of 1-(4-acetamido - 2 - chlorophenoxy)-3-chloro - 2 - propanol, 14 parts of isopropylamine and 20 parts of methanol is heated in a sealed tube at 110° C. for 12 hours. The excess of isopropylamine and the methanol are removed by evaporation under reduced pressure and the residue is shaken with a mixture of ethyl acetate and water. The organic layer is separated, dried and evaporated to dryness and the residue is crystallised from ethyl acetate. There is thus obtained 1-(4-acetamido-2-chlorophenoxy) - 3 - isopropylamino - 2-propanol, M.P. 141.5–142° C.

The process described above is repeated except that the appropriate chlorohydrin and amine are used, and there are thus obtained by similar means the compounds described in the following table:

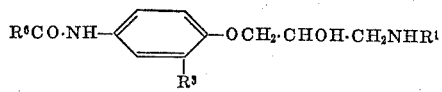

| R¹ | R⁶ | R³ | Melting point (° C.) | Crystallisation solvent |
|---|---|---|---|---|
| Isopropyl | Ethyl | Chloro | 146–147 | Ethyl acetate/hexane. |
| t-Butyl | do | do | 139.5–141 | Do. |
| Do | Methyl | do | 97–99 | Ethyl acetate/petroleum ether (B.P. 60–80° C.). |
| Cyclopentyl | do | do | 103–105 | Do. |

The 1-(4-acetamido-2-chlorophenoxy) - 3 - chloro - 2-propanol used as starting material in the above process may be obtained as follows:

A mixture of 2 parts of 4-acetamido-2-chlorophenol, 15 parts of epichlorohydrin, 0.05 part of piperidine and sufficient isopropanol to afford a clear solution is heated at 95–100° C. for 6 hours. The mixture is evaporated to dryness under reduced pressure and there is thus obtained as residue 1-(4-acetamido - 2 - chlorophenoxy)-3-chloro-2-propanol.

1-(2 - chloro - 4 - propionamidophenoxy)-3-chloro-2-propanol is obtained by analogous means, except that 2-chloro-4-propionamidophenol is used in place of 4-acetamido-2-chlorophenol.

EXAMPLE 6

A mixture of 4.5 parts of 1-(4-acetamido - 2 - chlorophenoxy)-3-chloropropan-2-ol and 2.41 parts of 1,1-dimethyl-2-phenylethylamine in 20 parts of methanol is heated in a sealed tube at 110° C. for 12 hours. This mixture is evaporated to dryness, 50 parts of water are added and the mixture is extracted with 200 parts and then with 100 parts of ethyl acetate. The combined organic extracts are evaporated to dryness and the residue is shaken with a mixture of 50 parts of ethyl acetate and 50 parts of aqueous 2 N-hydrochloric acid. The lowest, oily, layer and the aqueous layer are separated from the ethyl acetate layer and are basified with aqueous sodium hydroxide solution. The mixture is extracted twice with 60 parts of ethyl acetate each time and the combined extracts are dried and evaporated to dryness. The residue is triturated with ethyl acetate and the mixture is filtered. There is thus obtained as solid residue 1-(4-acetamido-2-chlorophenoxy)-3-(1,1-dimethyl - 2 - phenylethylamino)-2-propanol, M.P. 114–117° C.

EXAMPLE 7

The process described in Example 3 is repeated except that the appropriate epoxide and the appropriate amine are used as starting materials. There are thus obtained the compounds described in the following table:

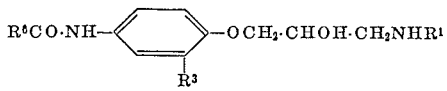

| $R^1$ | $R^6$ | $R^3$ | Melting point (° C.) | Crystallisation solvent |
|---|---|---|---|---|
| t-Butyl | Ethyl | Phenoxy | 1 188–189 | Ethanol/ether. |
| Isopropyl | do | Iodo | 160 | Ethyl acetate. |
| t-Butyl | do | do | 1 220 | Ethanol/ethyl acetate. |
| Isopropyl | do | Benzyl | 134 | Ethyl acetate. |
| t-Butyl | do | do | 1 246 | Isopropanol/water. |
| Do | p-Tolyl | do | 1 266–268 | Do. |
| Isopropyl | Ethyl | p-Tolyloxy | 88 | Ethyl acetate. |
| Do | n-Propyl | do | 88 | Do. |
| Do | Ethyl | α-Phenylethyl | 104–106 | Do. |
| t-Butyl | do | do | 1 222–224 | Isopropanol/ether. |
| Isopropyl | do | Cyclohexyl | 2 216 | Ethanol/water. |
| Cyclopentyl | do | Bromo | 124 | Ethyl acetate. |
| s-Butyl | do | do | 108 | Do. |
| t-Butyl | n-Propyl | do | 1 190–192 | Isopropanol/ether. |
| 2-hydroxy-1,1-dimethyl-ethyl. | Ethyl | do | 118 | Ethyl acetate. |
| t-Butyl | n-Pentyl | do | 96 | Ethyl acetate/petroleum ether (B.P. 80–100° C.). |
| Isopropyl | Ethyl | Propionyl | 92 | Ethyl acetate. |
| t-Butyl | do | Methylthio | 148–150 | Do. |
| Allyl | do | do | 110–112 | Do. |
| Isopropyl | n-Butyl | Bromo | 124 | Do. |
| Do | n-Hexyl | do | 130–132 | Do. |
| Do | Ethyl | Methoxymethyl | 129–130 | Petroleum ether (B.P. 60–80° C.). |
| Do | do | Phenyl | 115–116 | Ethyl acetate. |

1 Hydrochloride.
2 Picrate.

The epoxides used as starting materials in the above process may be obtained by a similar process to that described in the second part of Example 1, except that the 2-fluorophenol is replaced by the appropriate 2-substituted phenol.

EXAMPLE 8

The process described in Example 5 is repeated except that 1-(4-propionamido - 2 - trifluoromethylphenoxy)-3-chloro-2-propanol and t-butylamine are used as starting materials in place of 1-(4-acetamido-2-chlorophenoxy)-3-chloro-2-propanol and isoproylamine respectively, and that the product is converted into the hydrochloride thereof by conventional means. There is thus obtained 1-(4-propionamido-3-trifluoromethylphenoxy) -3-t-butylamino-2-propanol hydrochloride, M.P. 210–210° C.

The chlorohydrin used as starting material may be obtained from 4-propionamido-2-trifluoromethylphenol by a similar process to that described in the third part of Example 5.

Many of the 4-amino-2-substituted-phenols (prepared from the appropriate 2-substituted-phenol by a similar process to that described in the second part of Example 1) and the 4-acylamino-2-substituted-phenols (prepared by acylation of the corresponding 4-amino-2-substituted-phenol) which are used as intermediates in the preparation of the epoxides and chlorohydrins used as starting materials in Examples 3 to 8 are not characterised but are used without purification. Those phenols which have been characterised are described in the following table:

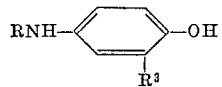

| $R^3$ | R | Melting point (° C.) | Crystallisation solvent |
|---|---|---|---|
| Bromo | Propionyl | 152 | Ethyl acetate. |
| Do | Valeryl | 78 | Ethyl acetate/petroleum ether (B.P. 60–80° C.). |
| Do | n-Hexanoyl | 86 | |
| Do | n-Heptanoyl | 145 | Ethyl acetate. |
| Phenyl | Acetyl | 155–156 | Aqueous ethanol. |
| Do | Propionyl | 99–100 | Ethyl acetate. |
| Chloro | do | 125–130 | Ethyl acetate/hexane. |
| Benzyl | do | 116 | |
| Do | p-Toluoyl | 144 | Ethyl acetate/petroleum ether (B.P. 60–80° C.). |
| p-Tolyloxy | Propionyl | 174 | |
| Do | Butyryl | 144 | |
| Cyclohexyl | Propionyl | 154–156 | Ethyl acetate. |
| Methoxymethyl | H | 126–127 | |
| Trifluoromethyl | Propionyl | 114–118 | |

EXAMPLE 9

The process described in Example 5 is repeated except that 1-(2-cyano-4-propionamidophenoxy)-3-chloro-2-propanol and t-butylamine are used as starting materials in place of 1-(4-acetamido-2-chlorophenoxy)-3-chloro-2-propanol and isopropylamine respectively, and that the product is converted into an oxalate salt by conventional means. There is thus obtained 1-(2-cyano-4-propionamidophenoxy)-3-t-butylamino-2-propanol oxalate hemihydrate, M.P. 187–190° C.

The 1 - (2-cyano-4-propionamidophenoxy)-3-chloro-2-propanol used as starting material may be obtained as follows:

A solution of 15 parts of 2-hydroxy-5-nitrobenzaldehyde in 160 parts of propionic anhydride is shaken with 8 parts of a 5% palladium-on-charcoal catalyst in an atmosphere of hydrogen at atmospheric pressure and ambient temperature for 16 hours, when three molecular proportions of hydrogen (with respect to the nitrocompound) have been absorbed. The mixture is filtered and the filtrate is evaporated to dryness. The residue is dissolved in 1,000 parts of 5% aqueous potassium hydroxide solution and the solution is extracted with 300 parts of ethyl acetate. The aqueous phase is separated and filtered, and the filtrate is acidified to pH=1. The mixture is extracted three times with 400 parts of ethyl acetate each time and the combined extracts are dried, treated with charcoal and filtered. The filtrate is evaporated to dryness and the residue is stirred with hexane. The mixture is filtered and there is thus obtained as solid residue 3-formyl-4-hydroxypropionanilide, M.P. 142–148° C.

A mixture of 4.75 parts of the above anilide, 1.97 parts of hydroxylamine hydrochloride, 3.1 parts of sodium formate and 30 parts of formic acid is stirred and heated under reflux for 1 hour and is then poured into 300 parts of water. The mixture is extracted twice with 200 parts of ether each time and the combined extract is dried and evaporated to dryness. The residue is crystallised from a mixture of ethyl acetate and hexane and there is thus obtained 3 - cyano - 4 - hydroxypropionanilide, M.P. 198–206° C.

The above cyano derivative is converted into the desired chlorohydrin by a similar process to that described in the third part of Example 5.

EXAMPLE 10

A solution of 2 parts of ethyl 2-hydroxy-5-propionamidobenzoate in 25 parts of epichlorohydrin containing 0.5 part of piperidine is heated at 95–100° C. for 7 hours. The excess of epichlorohydrin is removed by evaporation under reduced pressure and a mixture of the residue, 25 parts of methanol and 30 parts of t-butylamine is heated in a sealed vessel at 110° C. for 12 hours. The mixture is evaporated to dryness and the residue is partitioned between 100 parts of water and 100 parts of ethyl acetate. The ethyl acetate extract is dried and evaporated to dryness and there is thus obtained 1-(2-methoxycarbonyl-4-propionamidophenoxy)-3-t-butylaminopropan-2-ol, M.P. 143–5° C., the ethoxy carbonyl radical being converted into the methoxycarbonyl radical during the reaction by virtue of there being methanol present in the reaction mixture.

The ethyl 2-hydroxy-5-propionamidobenzoate used as starting material may be obtained as follows:

A mixture of 4 parts of ethyl 2-hydroxy-5-nitrobenzoate, 10 parts of propionic anhydride and 150 parts of ethanol is shaken with hydrogen in the presence of 0.5 part of a 5% palladium-on-charcoal catalyst until uptake of hydrogen is complete. The mixture is then poured into 500 parts of water and sodium bicarbonate is added until the pH of the solution is 9. The resulting aqueous suspension is extracted twice with 100 parts of ether each time and the combined ethereal extracts are dried and evaporated to dryness. The residue is crystallised from a mixture of ethyl acetate and petroleum ether (B.P. 60–80° C.) and there is thus obtained ethyl 2-hydroxy-5-propionamidobenzoate, M.P. 96–98° C.

EXAMPLE 11

A solution of 0.4 part of toluene-p-sulphonyl chloride in 8 parts of acetone is added to a mixture of 0.35 part of 1-(4-amino-2-bromophenoxy)-3-isopropylamino-2-propanol, 20 parts of water, 8 parts of acetone, 1 part of acetic acid and 1 part of sodium acetate and the mixture is kept at ambient temperature for 30 minutes and is then made alkaline with aqueous potassium bicarbonate solution. The mixture is extracted twice with 50 parts of ethyl acetate each time and the combined extracts are washed with water, dried and evaporated until one tenth of the original volume remains. The residue is heated to the boiling point of ethyl acetate and a boiling solution of 0.16 part of oxalic acid in 4 parts of ethyl acetate is added. The mixture is filtered and the solid residue is stirred with ether. The mixture is filtered and the solid residue is crystallized from a mixture of ethanol and ethyl acetate. There is thus obtained 1-(2-bromo-4-toluene-p-sulphonamidophenoxy) - 3-isopropylamino-2-propanol oxalate, M.P. 160° C. (with decomposition).

The 1-(4-amino-2-bromophenoxy)-3-isopropylamino-2-propanol used as starting material may be obtained as follows:

A mixture of 1 part of 1-(2-bromo-4-propionamidophenoxy)-3-isopropylamino-2-propanol, 10 parts of concentrated aqueous hydrochloric acid and 10 parts of water is heated under reflux for 3 hours, cooled and made alkaline with aqueous sodium hydroxide solution. The mixture is extracted with ethyl acetate and the extract is washed with water, dried and evaporated to dryness. There is thus obtained as residue 1-(4-amino-2-bromophenoxy)-3-isopropylamino-2-propanol which is use without further purification.

EXAMPLE 12

0.5 part of benzoyl chloride is added to a mixture of 0.5 part of 1-(4-amino-2-bromophenoxy)-3-t-butylamino-2-propanol, 0.15 part of acetic acid and 10 parts of water and the mixture is shaken at ambient temperature for 15 minutes. The mixture is filtered and sufficient aqueous 2 N-sodium hydroxide solution is added to the filtrate to raise the pH of the solution to 9.0–12.0. The mixture is extracted with 20 parts of ethyl acetate and the extract is washed with water and dried. An excess of saturated etheral hydrogen chloride solution is added and the mixture is evaporated to dryness. The residue is extracted with boiling ether and the extract is cooled and filtered. There is thus obtained as solid product 1-(4-benzamido-2-bromophenoxy)-3-t-butylamino-2-propanol hydrochloride, M.P. 189–191° C.

The 1-(4-amino-2-bromophenoxy)-3 - t-butylamino-2-propanol used as starting material may be obtained by a similar process to that described in the second part of Example 11, except that 1-(2-bromo-4-propionamidophenoxy)-3-t-butylamino-2-propanol is used as starting material.

EXAMPLE 13

A solution of 2.21 parts of N,N¹-dicyclohexylcarbodiimide in 20 parts of ethyl acetate is added rapidly to a stirred solution of 1.9 parts of 1-(4-amino-2-hydroxymethylphenoxy)-3-t-butylamino - 2-propanol and 2.65 parts of propionic acid in 30 parts of ethyl acetate which is cooled in an ice-bath. The course of the reaction is followed by placing small portions of the reaction mixture onto filter-paper which has been sprayed with a 4% solution of ceric ammonium nitrite in 10% aqueous sulphuric acid, the presence of the 4-aminophenoxy derivative being shown by the development of a purple coloration. When the reaction is complete (that is, when no 4-aminophenoxy derivative remains), 60 parts of aqueous 2 N-hydrochloric acid are added and the mixture is stirred vigorously and then filtered. The aqueous layer is separated, basified and extracted twice with 50 parts of ethyl acetate each time. The ethyl acetate extract is washed with water, dried and evaporated to dryness and the residue is purified by chromatography on silica gel and is then crystallised from a mixture of methanol, ethyl acetate and hexane. There is thus obtained 1-(2-hydroxymethyl - 4 - propionamidophenoxy)-3-t-butylamino-2-propanol, M.P. 161–164° C.

The 1 - (4-amino-2-hydroxymethylphenoxy)-3-t-butylamino-2-propanol used as starting material may be obtained as follows:

A mixture of 5 parts of 2-hydroxymethyl-4-nitrophenol, 30 parts of epichlorohydrin and 0.1 part of piperidine is heated at 95–100° C. for 6 hours. The excess of epichlorohydrin is removed by evaporation under reduced pressure and to the residue are added 40 parts of methanol and 40 parts of t-butylamine. The mixture is heated in a sealed tube at 110° C. for 12 hours and is then evaporated to dryness under reduced pressure. The residue is shaken with a mixture of ethyl acetate and water and the organic layer is separated, dried and evaporated to dryness. The residue is dissolved in 150 parts of ethanol and the solution is shaken with a platinum oxide catalyst in an atmosphere of hydrogen at ambient temperature and atmospheric pressure until three molecular proportions of hydrogen (with respect to the nitro compound) have been absorbed. The mixture is filtered and the filtrate is evaporated to dryness. There is thus obtained 1-(4-amino- 2-hydroxymethylphenoxy)-3-t-butylamino - 2 - propanol as an oil.

EXAMPLE 14

A mixture of 1.2 parts of 2-bromo-4-propionamidophenol, 25 parts of ethanol, 0.4 part of sodium hydroxide, 2 parts of water and 0.67 part of 1-chloro-3-isopropylamino-2-propanol hydrochloride is heated under reflux for 3 hours. The mixture is filtered and the filtrate is evaporated to dryness under reduced pressure. The residue is stirred with a mixture of 25 parts of ether and 25 parts of water, the mixture is filtered and the solid residue is crystallised from ethyl acetate. There is thus obtained 1-(2-bromo-4-propionamidophenoxy)-3-isopropylamino-2-propanol, M.P. 147–148° C.

EXAMPLE 15

A solution of 6 parts of 1-(2-chloro-4-propionamidophenoxy)-3-N-benzyl-N-t-butylamino-2-propanol in 100 parts of ethanol is shaken with hydrogen in the presence of 0.5 part of a 5% palladium-on-charcoal catalyst until absorption of hydrogen ceases. The mixture is filtered and the filtrate is evaporated to dryness. The residue is crystallised from a mixture of ethyl acetate and petroleum ether (B.P. 60–80° C.) an there is thus obtained 1-(2-chloro-4-propionamidophenoxy)-3-t - butylaminopropan-2-ol, M.P. 139.5–141° C.

The 1-(2-chloro-4-propionamidophenoxy)-3-N-benzyl-N-t-butylamino-2-propanol used as starting material may be prepared as follows:

A mixture of 98 parts of N-benzyl-t-butylamine and 63 parts of epichlorohydrin is heated at 95–100° C. for 4 hours and is then kept at ambient temperature for 17 hours. The mixture is shaken for 10 minutes with 100 parts of 20% aqueous sodium carbonate solution, 150 parts of 35% aqueous sodium hydroxide solution are added and the mixture is stirred and heated under reflux for 3 hours. The mixture is extracted with ether and the ethereal layer is dried over potassium carbonate and evaporated to dryness. The oily residue is distilled under reduced pressure and there is thus obtained 1,2-epoxy-3-(N-benzyl-N-t-butylamino)propane, B.P. 118–120° C./1.5 mm.

A solution of 3 parts of 2-chloro-4-propionamidophenol, 3.3 parts of 1,2-epoxy-3-(N-benzyl-N-t-butylamino)propane and 0.6 part of sodium hydroxide in 100 parts of ethanol is heated under reflux for 5 days. The solution is evaporated until only one quarter of the original volume remains and is then poured into 250 parts of water and the mixture is extracted with ether. The ethereal extract is dried and evaporated to dryness and there is thus obtained as residue 1-(2-chloro-4-propionamidophenoxy) - 3 - (N-benzyl-N-t-butylamino)-2-propanol.

EXAMPLE 16

0.3 part of sodium borohydride is added during ten minutes to a stirred mixture of 1 part of 3-amino-1-(2-bromo-4-propionamidophenoxy)-2-propanol, 15 parts of acetone and 15 parts of water. The mixture is evaporated until only one half of the original volume remains and is then extracted with 100 parts of ethyl acetate. The ethyl acetate extract is evaporated to dryness and the residue is washed with ether and then crystallised from ethyl acetate. There is thus obtained 1-(2-bromo-4-propionamidophenoxy)-3-isopropylamino-2-propanol, M.P. 147° C.

The 3-amino-1-(2-bromo-4-propionamidophenoxy)-2-propanol used as starting material may be obtained as follows:

3.0 parts of 1-(2-bromo-4-propionamidophenoxy)-2,3-epoxypropane are added to a solution of 12 parts of ammonia in 100 parts of methanol which contains 0.05 part of triethylamine, and the mixture is kept at ambient temperature for 12 hours and is then evaporated to dryness. The residue is stirred with 20 parts of ether, the mixture is filtered and the solid residue is crystallised from ethanol. There is thus obtained 3-amino-1-(2-bromo-4-propionamidophenoxy)-2-propanol, M.P. 125° C.

EXAMPLE 17

A mixture of 0.5 part of 3-amino-1-(2-bromo-4-propionamidophenoxy)-2-propanol, 1.5 parts of isopropyl bromide, 20 parts of isopropanol, 1 part of potassium carbonate and 0.1 part of potassium iodide is stirred at 70° C. for 12 hours. The mixture is filtered and the filtrate is evaporated to dryness under reduced pressure. 5 parts of water are added and the mixture is extracted with 50 parts of ethyl acetate. The ethyl acetate extract is evaporated until only one quarter of the original volume remains and is then kept for 1 hour. The mixture is filtered and the filtrate is evaporated to dryness. The residue is stirred with 10 parts of ether, the mixture is filtered and the solid residue is crystallised from ethyl acetate. There is thus obtained 1-(2-bromo-4-propionamidophenoxy)-3-isopropylamino-2-propanol, M.P. 147° C.

EXAMPLE 18

A mixture of 0.5 part of 1-(2-bromo-4-propionamidophenoxy)-3-isopropylamino-2-propanol and 10 parts of acetyl chloride is heated under reflux for 2 hours. The mixture is evaporated to dryness under reduced pressure and the residue is crystallised from a mixture of 5 parts of acetone and 5 parts of ether. There is thus obtained 2-(2-bromo-4-propionamidophenoxy)-1-(isopropylaminomethyl)ethyl acetate hydrochloride, M.P. 124–126° C.

EXAMPLE 19

A mixture of 2 parts of 1-(2-bromo-4-propionamidophenoxy)-3-isopropylamino-2-propanol, 100 parts of ethanol and 15 parts of 36% w./v. aqueous formalin solution is heated under reflux for 6 hours. The mixture is evaporated to dryness under reduced pressure, the residue is dissolved in 10 parts of ethanol and a saturated solution of picric acid in ethanol is added until the pH of the mixture is 1. The mixture is filtered and the solid residue is crystallized from aqueous ethanol. There is thus obtained 5-(2-bromo-4-propionamidophenoxymethyl)-3-isopropyloxazolidine picrate, M.P. 170° C.

The β-adrenergic blocking effect of a selection of the alkanolamine derivatives of the invention was measured in terms of the inhibition of isoprenaline-induced tachycardia in cats by the following procedure, which is standard in the art for the measurement of such activity and which is based on the procedure described by Black and Stephenson in The Lancet, August 1962, p. 311.

A cat was anaesthetised with chloralose, at a dose of 80 mg./kg. bodyweight given intravenously, and its heat rate and blood pressure were continuously recorded. Isoprenaline[1 - (3,4-dihydroxyphenyl)-2-isopropylaminoethanol] was then administered intravenously to the cat at intervals of 10 minutes, at a dose of 0.20 μg./kg. bodyweight each time. Each injection of isoprenaline caused a transient increase in heart rate (a tachycardia) and a transient fall in blood pressure, and the mean of three increases in heart rate, measured in beats per minute, was termed the control tachycardia. The compound under test was then administered to the cat by continuous intravenous infusion at a given rate (usually in the range between 1 and 10 μg./kg. bodyweight/minute) for a period of 30 minutes, the heart rate and blood pressure of the cat still being continuously recorded (it being understood that administration of the compound might in itself have some effect on the heart rate and/or blood pressure of the cat). Isoprenaline was again administered intravenously at intervals of 10 minutes at a dose of 0.20 μg./kg. bodyweight each time, and the tachycardia caused by the administration of isoprenaline 30 minutes after the beginning of infusion of the test compound was measured (the increase in heart rate being calculated using the heart rate immediately before administration of isoprenaline, and not necessarily that at the beginning of the experiment, as the base-line). The difference between this tachycardia and the control tachycardia was then expressed as a percentage of the control tachycardia, this percentage being termed the "percentage inhibition of the control tachycardia."

The rate of infusion of test compound was then increased, in geometric progression, such that test compound was administered for successive periods of 30 minutes at each rate, and isoprenaline-induced tachycardia was measured as described above, until a dose was reached which caused a 75% inhibition of the control tachycardia. The percentage inhibition of control tachycardia was then plotted graphically against the logarithm of the total amount of test compound infused during the 30 minutes immediately preceding the measurement of each tachycardia, and that dose which, when infused during 30 minutes produced a 50% inhibition of the control tachycardia, was determined from the graph. This dose, which is designated the $ED_{50}$ and is recorded in μg./kg. bodyweight, is taken as a measure of the β-adrenergic blocking activity of the test compound.

The results obtained with certain alkanolamine derivatives of the invention are as follows:

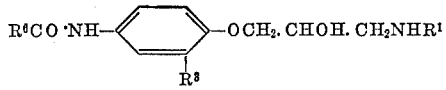

| $R^1$ | $R^3$ | $R^6$ | $ED_{50}$ (μg./kg.) |
|---|---|---|---|
| Isopropyl | Fluoro | Methyl | 360 |
| Do | do | Ethyl | 15 |
| t-Butyl | do | do | 90 |
| Isopropyl | Chloro | Methyl | 174 |
| t-Butyl | do | do | 69 |
| Cyclopentyl | do | do | 480 |
| 1,1-dimethyl-2-phenylethyl | do | do | 570 |
| Isopropyl | do | Ethyl | 131 |
| t-Butyl | do | do | 39 |
| Isopropyl | Bromo | Methyl | 66 |
| Do | do | Ethyl | 72 |
| t-Butyl | do | do | 11 |
| s-Butyl | do | do | 180 |
| 2-hydroxy-1,1-dimethylethyl | do | do | 63 |
| Cyclopentyl | do | do | 330 |
| t-Butyl | do | n-Propyl | 66 |
| Isopropyl | do | n-Butyl | 120 |
| t-Butyl | do | n-Pentyl | 81 |
| Isopropyl | do | n-Hexyl | 135 |
| Do | Iodo | Ethyl | 11 |
| t-Butyl | do | do | 6 |
| Isopropyl | Methylthio | Methyl | 280 |
| t-Butyl | do | Ethyl | 22 |
| Isopropyl | Phenyl | Methyl | 60 |
| Do | do | Ethyl | 84 |
| t-Butyl | Phenoxy | do | 60 |
| Isopropyl | p-Tolyloxy | do | 132 |
| Do | do | n-Propyl | 300 |
| Do | Methoxymethyl | Ethyl | 186 |
| t-Butyl | Hydroxymethyl | do | 33 |
| Do | Trifluoromethyl | do | 15 |
| Isopropyl | Benzyl | do | 219 |
| t-Butyl | do | do | 42 |
| Do | do | p-Tolyl | 660 |
| Isopropyl | α-Phenylethyl | Ethyl | 150 |
| t-Butyl | do | do | 120 |
| Isopropyl | Cyclohexyl | do | 198 |
| Do | Propionyl | do | 300 |
| t-Butyl | Cyano | do | 45 |
| Do | Methoxycarbonyl | do | 72 |

It is clear from the abovementioned results that the alkanolamine derivatives of the invention possess β-adrenergic blocking activity in warm-blooded animals. It is recommended that, in the treatment of warm-blooded animals, the alkanolamine derivatives of the invention be administered orally at a dose of between 0.25 and 10 mg. per kg. bodyweight daily, or at an intravenous dose of between 0.01 and 0.25 mg. per kg. bodyweight daily. In particular, when used in the treatment of man, it is recommended that a total daily oral dose of between 20 mg. and 600 mg., or a total daily intravenous dose of between 1 mg. and 20 mg., is used.

What we claim is:

1. An alkanolamine derivative selected from compounds of the formula:

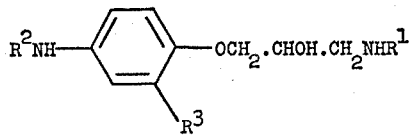

wherein $R^1$ is unsubstituted alkyl of up to 4 carbon atoms, alkyl of up to 4 carbon atoms which is substituted by hydroxy or phenyl, cycloalkyl of 3 to 5 carbon atoms or allyl; wherein $R^2$ is formyl, alkanoyl of up to 7 carbon atoms, benzoyl, toluoyl or toluenesulphonyl; and wherein $R^3$ is halogen, or methylthio, ethylthio, cyclohexyl, methoxycarbonyl, ethoxycarbonyl, phenyl, phenoxy, p-tolyloxy, hydroxymethyl, methoxymethyl, n-butoxymethyl, trifluoromethyl, benzyl or α-phenylethyl; and the pharmaceutically-acceptable acid-addition salts thereof.

2. An alkanolamine derivative selected from compounds of the formula:

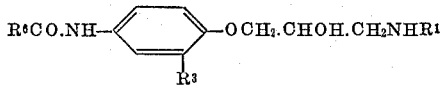

wherein $R^1$ is isopropyl or t-butyl, wherein $R^3$ has the meaning stated in claim 1 and wherein $R^6$ is alkyl of up to 6 carbon atoms, and the pharmaceutically-acceptable acid-addition salts thereof.

References Cited

FOREIGN PATENTS 1,543,690  9/1968  France _____ 260—562
1,543,689  9/1968  France _____ 260—562

HARRY I. MOATZ, Primary Examiner

U.S. Cl. X.R.

260—307 F, 348 A, 404, 465 E, 470, 471 A, 490, 556 R, 556 AR, 557 R, 558 D, 558 S, 558 P, 559 T, 559 B, 562 A, 562 B, 570.6; 424—300, 321, 324